US012691596B2

(12) United States Patent
Li et al.

(10) Patent No.: US 12,691,596 B2
(45) Date of Patent: Jul. 28, 2026

(54) SEAL ARRANGEMENT FOR A ROBOT JOINT

(71) Applicant: ABB Schweiz AG, Baden (CH)

(72) Inventors: Shanghua Li, Västerås (SE); Jiangwei Huang, Västerås (SE); Arne Trangärd, Västerås (SE)

(73) Assignee: ABB Schweiz AG, Baden (CH)

( * ) Notice: Subject to any disclaimer, the term of this patent is extended or adjusted under 35 U.S.C. 154(b) by 453 days.

(21) Appl. No.: 17/593,264

(22) PCT Filed: Mar. 22, 2019

(86) PCT No.: PCT/EP2019/057224
§ 371 (c)(1),
(2) Date: Sep. 14, 2021

(87) PCT Pub. No.: WO2020/192862
PCT Pub. Date: Oct. 1, 2020

(65) Prior Publication Data
US 2022/0161448 A1 May 26, 2022

(51) Int. Cl.
*B25J 19/00* (2006.01)
*B25J 11/00* (2006.01)
*B25J 17/02* (2006.01)

(52) U.S. Cl.
CPC ....... *B25J 19/0075* (2013.01); *B25J 11/0045* (2013.01); *B25J 17/02* (2013.01)

(58) Field of Classification Search
CPC .... B25J 11/0045; B25J 17/02; B25J 19/0075; F16J 15/3208; F16J 15/3212
(Continued)

(56) References Cited

U.S. PATENT DOCUMENTS 3,337,221 A * 8/1967 Hulsebus ............. F16J 15/3264
440/83
4,312,547 A 1/1982 Negele et al.
(Continued)

FOREIGN PATENT DOCUMENTS

DE 3833690 A1 4/1990
EP 0744252 A1 11/1996
(Continued)

OTHER PUBLICATIONS

Moreno Masey, Rene J., et al; "Guidelines for the design of low-cost robots for the food industry"; 2010, Industrial Robot: An International Journal, vol. 37 Issue: 6; Emerald Group Publishing Limited; United Kingdom; Oct. 19, 2010; 9 Pages.
(Continued)

*Primary Examiner* — William C Joyce
(74) *Attorney, Agent, or Firm* — Whitmyer IP Group LLC

(57) ABSTRACT

A robot joint including a first robot part and a second robot part arranged to have a relative movement in between, a joint gap separating the first robot part and the second robot part from each other, and a seal arrangement for sealing the joint gap against external impact. The seal arrangement includes a first side element being part of the first robot part and immobile in relation to the same, and a gap element extending across the joint gap. One of the first side element and the gap element includes a first surface in a food grade material, and the other one of the first side element and the gap element includes a first sealing element configured to be in sliding contact with the first surface.

18 Claims, 5 Drawing Sheets

(58) Field of Classification Search
USPC ......................................................... 277/571
See application file for complete search history.

(56)                        References Cited

U.S. PATENT DOCUMENTS

| | | | |
|---|---|---|---|
| 4,900,039 A | | 2/1990 | Klecker et al. |
| 6,484,067 B1 * | 11/2002 | Kinoshita ............ B25J 19/0062 |
| | | | 277/534 |
| 7,603,927 B2 * | 10/2009 | Markert ............... B25J 19/0075 |
| | | | 901/29 |
| 7,878,088 B2 * | 2/2011 | Tamura ................ B25J 19/0075 |
| | | | 74/490.05 |
| 8,113,597 B2 * | 2/2012 | Grenzi ............... B62D 55/0887 |
| | | | 305/202 |
| 9,333,656 B2 * | 5/2016 | Hahakura ............ B25J 19/0062 |
| 10,011,026 B2 * | 7/2018 | Okada ...................... B25J 17/00 |
| 2002/0074732 A1 | 6/2002 | Burroughs |
| 2005/0111940 A1 | 5/2005 | Markert et al. |
| 2008/0258402 A1 | 10/2008 | Tamura et al. |
| 2010/0090523 A1 | 4/2010 | Grenzi |
| 2017/0361471 A1 | 12/2017 | Groll et al. |
| 2019/0346045 A1 | 11/2019 | Grant et al. |

FOREIGN PATENT DOCUMENTS

| | | | | |
|---|---|---|---|---|
| JP | 61-47159 | * | 3/1986 | |
| JP | 63-36759 | * | 3/1988 | |
| JP | 7-14270 | * | 3/1995 | |
| JP | 2002228007 A | * | 8/2002 | .......... F16C 33/7863 |
| JP | 2011069401 A | * | 4/2011 | |

OTHER PUBLICATIONS

International Search Report and Written Opinion of the International Searching Authority; Application No. PCT/EP2019/057224; Completed: Dec. 13, 2019; Mailing Date: Dec. 20, 2019; 14 Pages.
Chinese Office Action; Application No. 201980094230X; Completed: Sep. 26, 2023; Issued: Sep. 28, 2023; 14 Pages.
Chinese Office Action; Application No. 201980094230X; Completed: Mar. 22, 2024; 20 Pages.

* cited by examiner

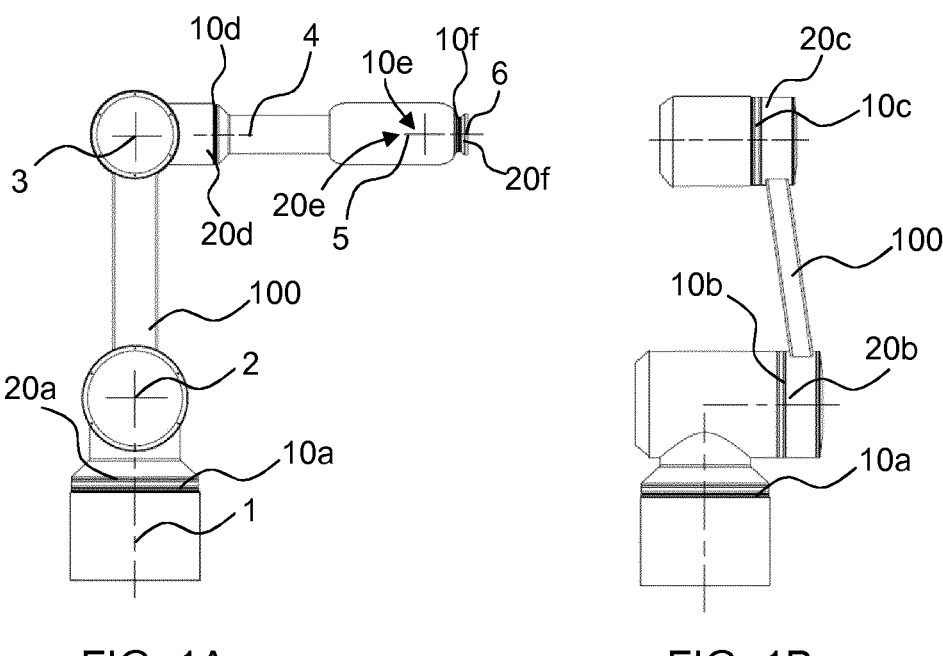
FIG. 1A                    FIG. 1B
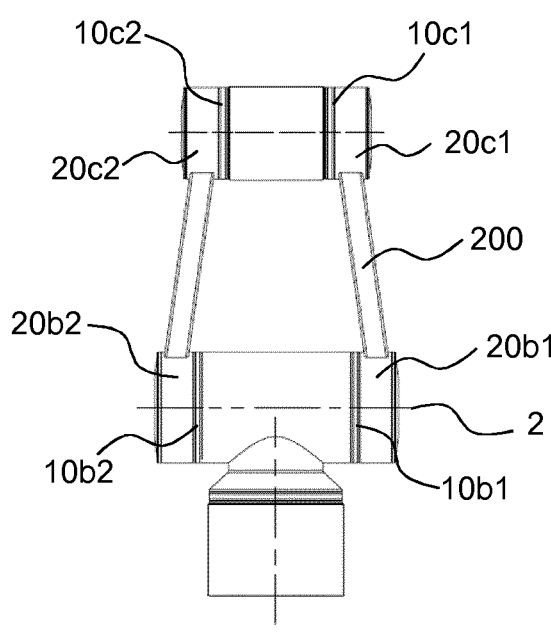
FIG. 2

SEAL ARRANGEMENT FOR A ROBOT JOINT

TECHNICAL FIELD

The present disclosure relates to fluid-tight sealing of robots, and in particular to sealing of robot joints. The disclosure also relates to a robot comprising at least one sealed joint.

BACKGROUND

Equipment used in the food processing of protein industry (that is meat, poultry, fish, seafood and dairy) is subject to strict hygiene requirements and must be washed down daily using hot high-pressure water and chemical agents. A robot intended for food processing in wash down applications should preferably have a complete stainless-steel housing or frame which is hygienically designed to be easy to clean. The robot needs to have a high-water protection rating— Ingress Protection 69K (IP69K). The IP69K rating defines what is needed to provide protection against ingress of dust and high temperature, high pressure water—making products with this certification suitable for use in conditions where equipment must be carefully sanitized. In industries such as food processing, where hygiene and cleanliness is paramount, equipment must be able to withstand rigorous high pressure, high temperature wash-down procedures. In many industries, where dust and dirt can be an issue, it is important to ensure that dust and dirt cannot penetrate the casing of a robot and cause it to fail.

Even if the robot is provided with a stainless-steel housing, the joints may be a source to contamination. Typically, the robot is provided with rotary seals inside the robot that seal the motors and gears. However, the other parts of the robot that are not sealed may suffer from severe corrosion from the inside in the washdown environment. When washdown fluids (e.g. acid, alkaline or chlorinated liquids) and other materials from e.g. food processing get inside the robot, it will accelerate corrosion of the robot. Therefore, the joints of a robot should be sealed such that no fluid or material can enter the joints during working or wash down.

From the article "Guidelines for the design of low-cost robots for the food industry", by Rene J. Moreno Masey et al, 2010, Industrial Robot: An International Journal, Vol. 37 Issue: 6, p. 509-517, it is known to provide a robot with a stainless-steel material. It is described to use a spring-energized PTFE face seal to seal robot joints, but it is not in detail described how the seal is implemented.

SUMMARY

It is an object of the disclosure to alleviate at least some of the drawbacks with the prior art. It is a further object of the disclosure to provide a robot joint with a sealing that is designed for hygienic environments. It is a further object to provide a robot joint with a sealing that securely withstands external pressure. It is another object to provide a robot joint with a sealing that is durable. It is a further object to provide a sealing arrangement of a robot to a comparably low cost.

According to a first aspect, the disclosure relates to a robot joint comprising a first robot part and a second robot part arranged to have a relative movement in between, a joint gap separating the first robot part and the second robot part from each other, and a seal arrangement for sealing the joint gap against external impact. The seal arrangement comprises a first side element being part of the first robot part and immobile in relation to the same, and a gap element extending across the joint gap. One of the first side element and the gap element comprises a first surface in a food grade material, and the other one of the first side element and the gap element comprises a first sealing element configured to be in sliding contact with the first surface.

The first aspect provides a sealing of a robot joint that is designed for hygienic environments as it is provided with a food grade material surface that is the contact surface for the sealing element. Food grade materials are materials that are considered safe to be in contact with food i.e. materials that do not contaminate the food with substances harmful or potentially harmful for human.

Also terms like "food contact materials" and "hygienic materials" are used to refer to food grade materials. If it is not obvious what materials shall be considered as food grade materials, the directives of the U.S. Food and Drug Administration (FDA) should be taken into consideration.

In some embodiments, the first side element is integral with the first robot part. As the external surfaces of the first robot part also need to be in food grade material, the first surface can be provided by locally treating, e.g. by hardening and/or polishing, the first robot part to achieve an appropriate contact surface for the sealing element. This solution implies that the first side element comprises the first surface, and the gap element comprises the first sealing element.

In some embodiments, the first robot part comprises a first robot interface configured to receive the first side element. Considering solutions where the first side element comprises the first surface (and the gap element comprises the first sealing element), as local treatment of the first robot part may be expensive, it may be advantageous to provide the first side element comprising the first surface as a separate insert configured to be fixedly attached to the first robot interface. Considering solutions where the first side element comprises the first sealing element, it is a quite obvious alternative to provide the first robot part with an interface fixedly receiving the first side element.

In some embodiments, the seal arrangement comprises a second side element being part of the second robot part and immobile in relation to the same, one of the second side element and the gap element comprising a second surface in a food grade material, and the other one of the second side element and the gap element comprising a second sealing element configured to be in sliding contact with the second surface. By providing the seal arrangement with two interfaces having a sliding contact instead of one, the speed between the respective sealing elements and surfaces can be reduced to half.

In some embodiments, the second side element is integral with the second robot part.

In some embodiments, the second robot part comprises a second robot interface configured to receive the second side element.

In some embodiments, the first robot part comprises a first recess partly accommodating the gap element.

In some embodiments, the second robot part comprises a second recess partly accommodating the gap element.

In some embodiments, the first side element comprises the first surface, and the gap element comprises the first sealing element.

In some embodiments, the second side element comprises the second surface, and the gap element comprises the second sealing element.

In some embodiments, the gap element comprises the first surface, and the first side element comprises the first sealing element.

In some embodiments, the gap element comprises a second surface in a food grade material, and the second side element comprises the second sealing element.

In some embodiments, the food grade material comprises hardened stainless-steel.

In some embodiments, the first surface and/or the second surface has a surface hardness of at least 800 HV0.05, such as at least 1000 HV0.05, at least 1200 HV0.05, or at least 1400 HV0.05.

In some embodiments, the first surface and/or the second surface has a surface roughness expressed as an $R_a$ value of at most 0.8 μm, such as at most 0.6 μm, at most 0.4 μm, or at most 0.2 μm.

In some embodiments, an energizing mechanism is configured to increase contact pressure between the first surface and the first sealing element.

In some embodiments, the energizing mechanism is integrated in the gap element.

BRIEF DESCRIPTION OF THE DRAWINGS

FIG. 1A illustrates a robot from a side view, where the robot comprises a plurality of joints.

FIG. 1B illustrates the robot in FIG. 1A in a view from behind.

FIG. 2 illustrates a fork robot from a view from behind, where the robot comprises a plurality of joints.

DETAILED DESCRIPTION

Figure 3:
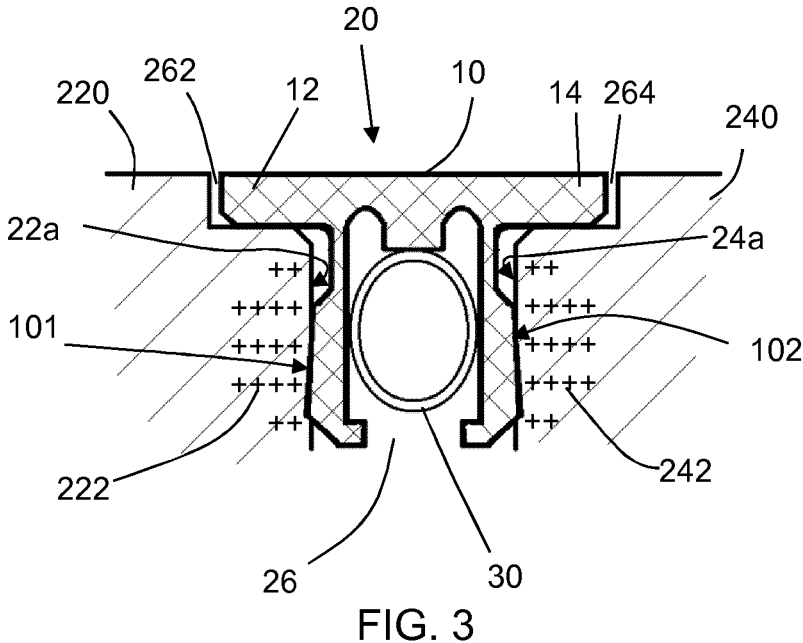
FIG. 3 illustrates a cross-section of a face seal according to a first embodiment, when provided in a robot joint.

To manage high hygienic design criteria, for example for food equipment, the disclosure proposes a robot joint that is provided with a seal arrangement comprising at least one hardened stainless-steel surface. The robot joint comprises a first robot part and a second robot part arranged to have a relative movement in between. The robot where the robot joint is arranged is according to one embodiment provided with a stainless-steel housing, to reduce corrosion to the robot. To allow the relative movement between the first robot part and the second robot part, there is a gap in the stainless-steel housing at the robot joint. This gap, hereinafter referred to as a "joint gap", is thus provided with a seal arrangement meeting the water protection level stipulated by IP69K. The sealing is hygienic as the joint gap will be efficiently tightened.

The at least one hardened stainless-steel surface is hardened, typically by a hardening process, and arranged in sliding contact with a respective sealing element or sealing elements. Thereby, the at least one hardened stainless-steel surface will not wear down easily, and it will give a reduced friction towards the face seal compared to if the stainless-steel surface was not hardened. More in detail, the hardening process will increase surface hardness to 800-1500 HV0.05 (microhardness, HV0.05 refers e.g. to the "Vickers" test method). Thus, hardened stainless-steel as referred to herein has, according to one embodiment, a surface microhardness of 800-1500 HV0.05.

In the following robot joints comprising seal arrangements according to different embodiments, and robots comprising one or several such robot joints, will be described.

First, some exemplary robots will be described, with reference to FIGS. 1-2. FIGS. 1A and 1B illustrate an industrial robot 100 with six axes 1-6, hereafter referred to as "robot 100". The robot 100 is a programmable robot that has six degrees of freedom (DOF). Each axis comprises a driving mechanism for driving an arm or a wrist. The driving mechanism comprises a driving motor, for example a brushless DC motor. A transmission comprising speed reducers and/or gearboxes transmits the torque from the driving motor, via an output shaft of the driving motor, to the joint 20 of the axis. The joint 20 comprises a first robot part 220 and second robot part 240 (FIG. 5). The first robot part 220 is typically arranged stationary in relation to the driving motor of the axis, and the second robot part 240 is arranged to rotate together with the arm or wrist in relation to the driving motor. Thus, the second robot part 240 will rotate in relation to the first robot part 220 when the joint is operated. The first robot part 220 and the second robot part 240 are thus rotatable in relation to each other. Between the first robot part 220 and the second robot part 240 there is a joint gap 26 (FIG. 4), and a gap element in the form of a face seal 10 is arranged to seal the joint gap 26. Thus, the face seal 10 is arranged to seal the first robot part 220 and the second robot part 240. In the robot 100 of FIGS. 1A and 1B, each joint 20a, 20b, 20c, 20d, 20e, 20f is sealed with a respective face seal 10a, 10b, 10c, 10d, 10e, 10f. It should be understood that a robot may comprise more or less joints than six, and thus more or less face seals than six. It should also be understood that the number of face seals may be less than the number of joints i.e. not every joint needs to comprise a face seal.

FIG. 2 illustrates a robot 200 with a fork structure, also referred to as a "fork robot". The fork robot 200 essentially comprises the same parts as the robot 100 in FIGS. 1A-1B, except that it has a double second axis 2 with two joints 20b1, 20b2, a double third axis 3 with two joints 20c1, 20c2 and a double link that connects the respective double second axis 2 and the double third axis 3. The fork robot 200 may have an increased stability compared to the robot 100 in FIGS. 1A-1B. Each joint 20b1, 20b2 of the double second axis 2 may be driven by an individual driving mechanism. Each joint 20c1, 20c2 of the double third axis 3 may be driven by an individual driving mechanism. Each joint 20b1, 20b2, 20c1, 20c2 is sealed with a respective face seal 10b1, 10b2, 10c1, 10c2. However, it should be understood that also here the number of face seals may be less than the number of joints i.e. not every joint needs to comprise a face seal.

FIG. 3 illustrates a cross-section of a face seal 10 according to a first embodiment, when provided in a robot joint 20. The robot joint 20 may be any of the robot joints as explained herein. The first robot part 220 of the robot joint 20 defines a first hardened stainless-steel surface in the form of a first inner face 22a limiting the joint gap 26. The second robot part 240 of the robot joint 20 defines a second hardened stainless-steel surface in the form of a second inner face 24a limiting the joint gap 26. The inner faces 22a, 24a are typically radial faces, thus they extend in a radial direction from the motor shaft of the axis. In one embodiment, the first robot part 220 comprises an area hardened by a hardening process to constitute a first side element 222. Then, the first side element 222 comprising the first inner face 22a is integral with the first robot part 220. In another embodiment the first robot part 220 comprises a first robot interface 221 (FIG. 6) configured to receive the first side element 222, as will be described later with reference to FIGS. 5 to 6. Then, the first side element 222 comprising the first inner face 22a is non-integral with the first robot part 220. In one embodiment, the second robot part 240 also comprises an area hardened by a hardening process to constitute a second side element 242. Then, the second side element 242 comprising the second inner face 24a is integral with the second robot part 240. In another embodiment the second robot part 240 comprises a second robot interface 241 (FIG. 6) configured to receive the second side element 242, as will be described later with reference to FIGS. 5 to 6. Then, the second side element 242 comprising the second inner face 24a is non-integral with the second robot part 240.

The face seal 10 according to the first embodiment comprises an annular body designed to have a radial jacket with a flange. In cross-section, the face seal 10 may be seen as having the general shape of a "T", where the horizontal leg of the "T" forms first and second flange parts 12, 14, and the vertical leg is split into two legs forming the radial jacket. The upper side of the "T" makes up the external side of the face seal 10, that is designed to front the exterior of the robot 100, 200. The face seal 10 has two dynamic sealing elements in the form of a first sealing face 101 and a second sealing face 102, thus the outer sides of the radial jacket of the "T". The first sealing face 101 is arranged in sliding contact with the first inner face 22a of the first robot part 220. The second sealing face 102 is arranged in sliding contact with the second inner face 24a of the second robot part 240.

In order to hold the face seal 10 in place in the joint gap 26 and make sure the face seal 10 is not pushed into the joint gap 26 when acted upon by external pressure, the first robot part 220 is provided with a first recess 262 that accommodates the first flange part 12. In other words, the joint gap 26 defines a first recess 262 in the first robot part 220 towards the exterior of the robot joint 20, and the face seal 10 is partly accommodated in the first recess 262. Here, the second robot part 240 is provided with a second recess 264 that accommodates the second flange part 14. In other words, the joint gap 26 defines a second recess 264 in the second robot part 240 towards the exterior of the robot joint 20, and the face seal 10 is partly accommodated in the second recess 264. In an alternative embodiment, the joint 20 comprises only the first recess 262 arranged to accommodate only the first flange part 12 of a respective face seal 10 not comprising the second flange part 14. The first and second recesses 262, 264 may have a slightly larger axial dimension than the first and second flange parts 12, 14, such that the first and second flange parts are allowed to be slightly compressed by external pressure and expand axially.

To make sure the face seal 10 is held in a tight fit in the joint gap 26, the face seal 10 comprises an energizing mechanism 30 configured to increase contact pressure between the face seal 10 and the first robot part 220. Here, the energizing mechanism 30 is configured to increase contact pressure also between the face seal 10 and the second robot part 240. The energizing mechanism is for example a spring element or an elastic tube that is arranged in the radial jacket. The energizing mechanism 30 is in contact with inner sides of the jacket, to push the first sealing face 101 towards the first inner face 22a of the first robot part 220 and the second sealing face 102 towards the second inner face 24a of the second robot part 240.

Figure 4:
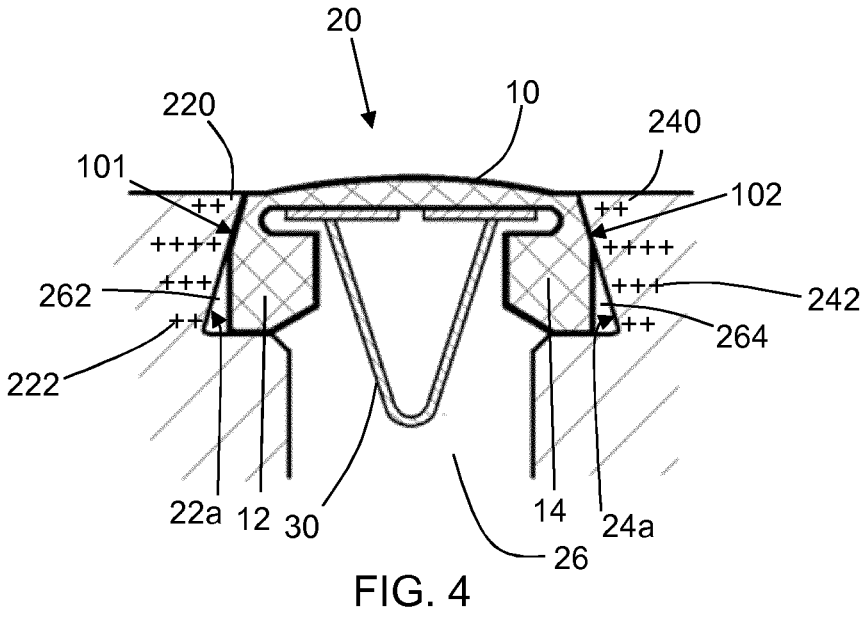
FIG. 4 illustrates a cross-section of a face seal according to a second embodiment, when provided in a robot joint.
Figure 5:
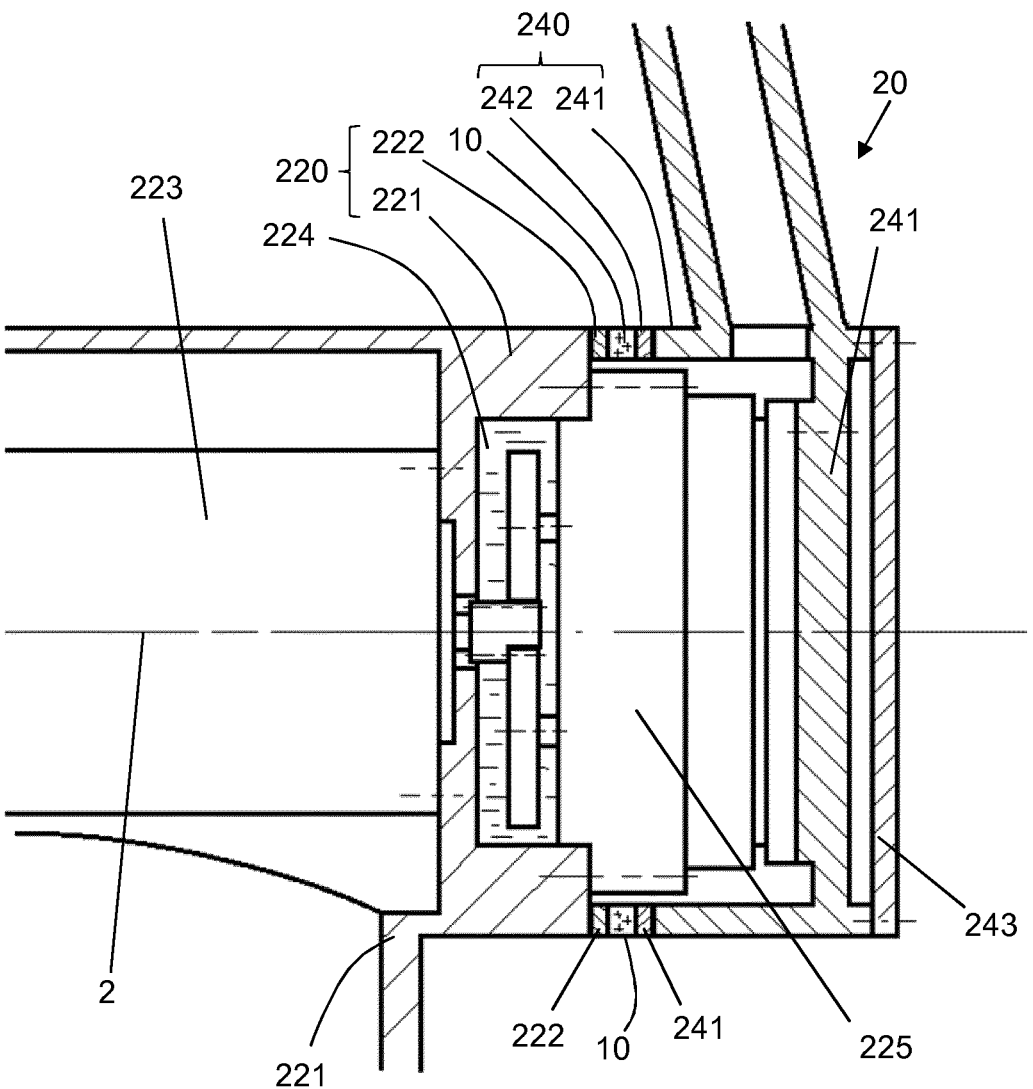
FIG. 5 illustrates cross-section of a robot joint provided with a face seal and non-integral side elements according to some embodiments.

FIG. 4 illustrates a cross-section of a face seal 10 according to a second embodiment, when provided in a robot joint 20. The robot joint 20 may be any of the robot joints as explained herein. The reference numbers that are the same as in FIG. 3 refer to the same respective features and will not be repeated here. The face seal 10 according to the second embodiment generally has the same function as the face seal 10 according to the first embodiment. However, in this embodiment the first recess 262 and the second recess 264 are shaped to allow the face seal to expand into the first recess 262 and the second recess 264 in an angular manner, when the face seal 10 is exposed to external pressure against the external side of the face seal 10. Also, the energizing mechanism 30 has a cross-section of a "V". The energizing mechanism 30 is at least partly arranged inside the jacket of the face seal, where the upper part of the "V" rests against an internal side, that is opposite the external side, of the face seal 10. The outer sides of the "V" are in contact with inner sides of the jacket, to push the first sealing face 101 towards the first inner face 22a of the first robot part 220 and the second sealing face 102 towards the second inner face 24a of the second robot part 240. When pressure is exerted on the exterior side of the face seal 10, the face seal 10 will be pushed into the first recess 262 and the second recess 264, increase the contact pressure and area of the contact surfaces and thus make the sealing even more secure.

The face seal 10 should be made of a material that is FDA-compliant. For example, the face seal 10 may be made of a polytetrafluoroethylene (PTFE) based material with approved additives, or Ultra-high-molecular-weight polyethylene (UHMWPE) based material with approved additives.

FIG. 5 illustrates a cross-section of an exemplary robot joint 20, here a second robot joint 20b, 20b1 of the robots 100, 200, provided with a face seal 10.

In this exemplary embodiment, the first robot part 220 of the robot joint 20 comprises a first robot interface 221 and a first side element 222 which is non-integral with the first robot part 220. The first robot interface 221 is here a stationary part of the joint 20. The first robot interface 221 comprises part of a first housing, or the entire first housing, of the stationary part of the corresponding axis. As shown in the FIG. 5, within the first housing is arranged a driving mechanism comprising a motor 223 driving a driving shaft that is arranged to a transmission 225. Between the motor 223 and the transmission 225, there is oil 224. The second robot part 240 of the robot joint 20 comprises a second robot interface 241 and a second side element 242 which is non-integral with the second robot part 240. The second robot interface 241 is here a rotary part. The second robot interface 241 rotates with the rotational motion of the driving shaft around the axis 2. The second robot interface 241 comprises part of a second housing, or the entire second housing, of the rotary part of the corresponding axis. The second housing is connected to the gear box 225. The rotary part comprises a lid 243 that closes the rotary part.

As understood from the figures, the face seal 10 is annular and is arranged to seal the robot joint 20 towards the exterior of the robot. The external side(s) of the face seal 10 may be aligned with the external sides of the robot joint 20, that are in direct proximity with the joint gap 26.

Figure 6:
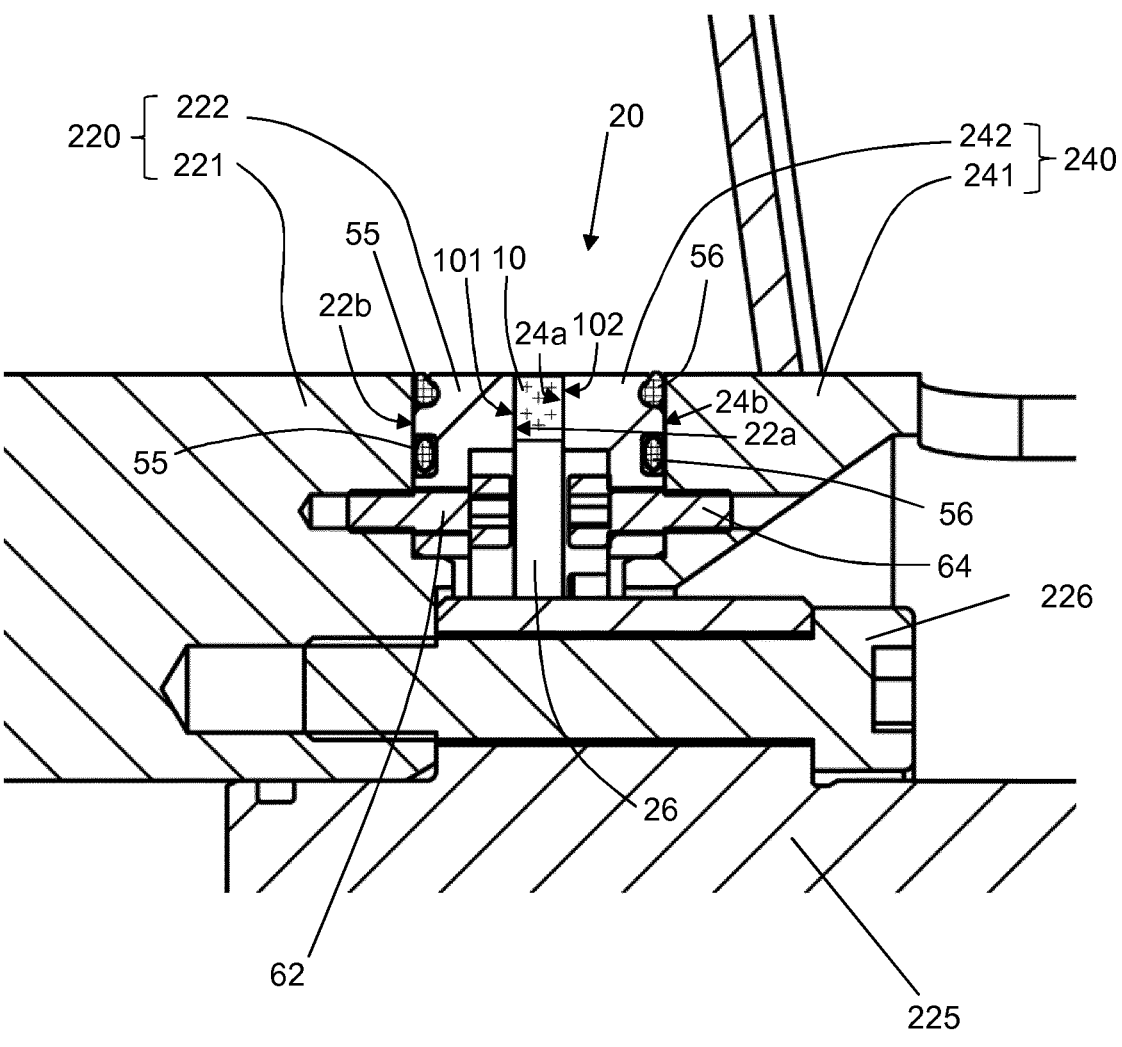
FIG. 6 illustrates an enlarged view of one cross-section of the face seal and the non-integral side elements illustrated in FIG. 5.

Now reference is made to FIG. 6 that illustrates an enlarged view of one cross-section of the face seal 10 and the first and second side elements 222, 242 illustrated in FIG. 5. As already illustrated in FIG. 5, there are first and second side elements 222, 242 between the face seal 10 and the first robot interface 221 and the second robot interface 241, respectively. The face seal 10 may be arranged concentric between the first side element 222 and the second side element 242. Alternatively, the robot joint 20 may comprise only one of the first and second side elements 222, 242. The face seal 10 will then be in direct contact with the first robot interface 221 or the second robot interface 241 on the side that does not comprise a side element 222, 242.

The face seal 10, the first side element 222 and/or the second side element 242 may be referred to as a seal arrangement. The first side element 222 is arranged between the first robot interface 221 and the face seal 10. Thus, the first side element 222 is designed to bridge the first robot interface 221 and the face seal 10. The first side element 222 comprises an annular body. The first side element 222 has a first inner face 22a. The first inner face 22a is a hardened stainless-steel surface. The face seal 10 is arranged such that the first sealing face 101 of the face seal 10 is in sliding contact with the first inner face 22a. The first side element 222 also comprises a first outer face 22b arranged to be attached to the first robot interface 221. The first side element 222 further has an external side that faces the exterior of the robot joint 20. The first side element 222 is attached to the first robot interface 221 by means of a first bolt 62.

The second side element 242 is arranged between the second robot interface 241 and the face seal 10. Thus, the second side element 242 is designed to bridge the second robot interface 241 and the face seal 10. The second side element 242 comprises an annular body. The second side element 242 has a second inner face 24a. The second inner face 24a is a hardened stainless-steel surface. The face seal 10 is arranged such that the second sealing face 102 of the face seal 10 is in sliding contact with the second inner face 24a. The second side element 242 also comprises a second outer face 24b arranged to be attached to the second robot interface 241. The first side element 222 further has an external side that faces the exterior of the robot joint 20. The second side element 242 is attached to the second robot interface 241 by means of a second bolt 64.

As the first and second side elements 222, 242 that are provided with the hardened stainless-steel surfaces are non-integral with the first robot part 220, the cost may be reduced. This because the hardening typically is payed per kilo that should be hardened, and the non-integral first and second side elements 222, 242 have a lower weight than the first robot interface 221 and the second robot interface 241. One purpose of the non-integral first and second side elements 222, 242 is thus to decrease the amount om stainless-steel material to be hardened.

The first outer face 22b has a plurality of first incisions 55, e.g. annular incisions, where grinding particles etc. may be collected. The second outer face 24b has a plurality of second incisions 56, e.g. annular incisions, where grinding particles etc. may be collected. Alternatively, the first outer face 22b and/or the second outer face 24b may only have one annular incision, respectively.

Figure 7:
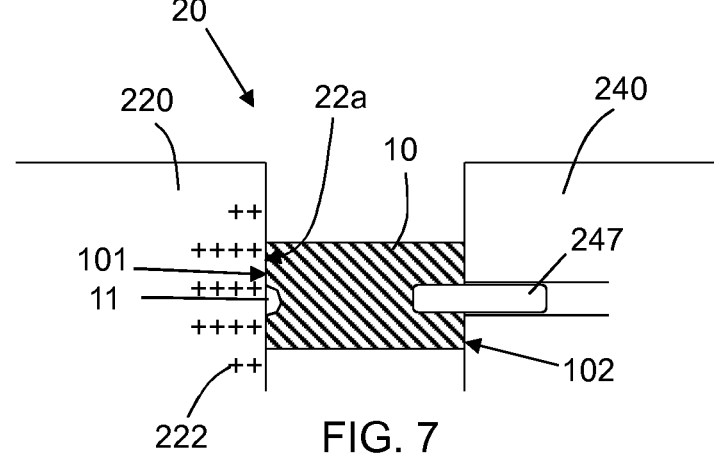
FIG. 7 illustrates a cross-section of a face seal according to a third embodiment, when provided in a robot joint.

FIG. 7 illustrates a cross-section of a robot joint 20 provided with a face seal 10 according to a third embodiment. The robot joint 20 differs from the previous embodiments in that it only has dynamic sealing element on one side of the joint gap 26. As in the other embodiments, the first robot part 220 defines a first inner face 22a limiting the joint gap 26, and the first inner face 22a is a hardened stainless-steel surface. The face seal 10 is arranged in the joint gap 26 to seal the joint gap 26, wherein the face seal 10 comprises a first sealing face 101 that is arranged in sliding contact with the first inner face 22a of the first robot part 220. The first sealing face 101 has a third incision 11, e.g. an annular incision, where grinding particles etc. may be collected. The face seal 10 is fastened or bonded to the second robot part 240, for example by means of a third bolt 247.

Figure 8:
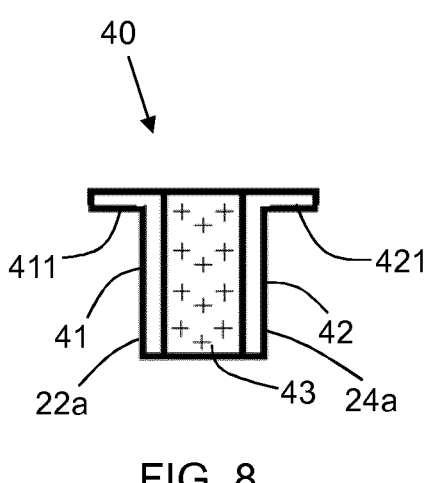
FIG. 8 illustrates a cross-section of a joint seal assembly in isolation.

FIG. 8 illustrates a cross-section of a gap element in the form of a joint seal assembly 40 according to some embodiments. The joint seal assembly 40 is intended to be provided in a joint gap 26 of a robot joint 20 according to FIG. 9. The joint seal assembly 40 comprises a first annular insert body 41, a second annular insert body 42 and an annular bonding element 43. The annular bonding element 43 is interposed concentric between the first annular insert body 41 and the second annular insert body 42. The annular bonding element 43 is also bonded to the first annular insert body 41 and the second annular insert body 42. The first annular insert body 41 comprises a first flange 411. The second annular insert body 42 comprises a second flange 421. The first annular insert body 41 and the second annular insert body 42 are made of hardened stainless-steel. The annular bonding element 43 is for example made of PTFE or UHMWPE.

Figure 9:
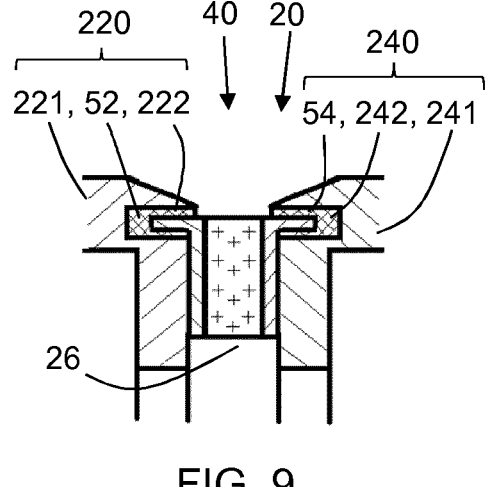
FIG. 9 illustrates the joint seal assembly of FIG. 8 when provided in a robot joint.

FIG. 9 illustrates the cross-section of the joint seal assembly 40 in FIG. 8 arranged in a robot joint 20. The robot joint 20 comprises a first robot interface 221 and a second robot interface 241 arranged to have a relative movement in between. A joint gap 26 separates the first robot interface 221 and the second robot interface 241 from each other. The joint gap 26 is provided with the joint seal assembly 40 in FIG. 8.

As illustrated in the FIG. 9, the first robot interface 221 is provided with a recess receiving a first sealing element in the form of a first rubber gasket 52, which in this embodiment constitutes the first side element 222. The first annular insert body 41 is provided with a first flange 411 received in the first rubber gasket 52 to provide a sliding contact therein-between.

The second robot interface 241 is provided with a recess receiving a second sealing element in the form of a second rubber gasket 54, which in this embodiment constitutes the second side element 242. The second annular insert body 42 is provided with a second flange 421 received in the second rubber gasket 54 to provide a sliding contact thereinbetween.

The joint seal assembly 40 may reduce the complexity of assembly. The joint seal assembly 40 has a rather simple design and may therefore reduce manufacturing costs. As it is already assembled when received at the robot manufacturer, the solution may save on costs for logistics and storage. The compact seal structure renders a good sealing performance.

The invention claimed is:

1. A robot joint comprising:
   a first robot part and a second robot part arranged to have a relative movement in between,
   a joint gap separating the first robot part and the second robot part from each other,
   a seal arrangement for sealing the joint gap against external impact, the seal arrangement including a first side element being part of the first robot part and immobile in relation to the same, and a gap element extending across the joint gap, wherein the first side element includes a first surface in a food grade material, and the gap element includes a first seal element configured to be in sliding contact with the first surface, and an energizing mechanism configured to increase contact pressure between the first surface and the first seal element;

wherein the gap element is in the form of a face seal: and wherein the first robot part comprises a first recess partly accommodating the gap element.

2. The robot joint according to claim 1, wherein the first side element is integral with the first robot part.

3. The robot joint according to claim 2, wherein the first robot part comprises a first recess partly accommodating the gap element.

4. The robot joint according to claim 1, wherein the first robot part comprises a first robot interface configured to receive the first side element.

5. The robot joint according to claim 1, wherein the food grade material comprises hardened stainless-steel.

6. The robot joint according to claim 1, wherein the energizing mechanism is integrated in the gap element.

7. The robot joint according to claim 1, wherein the seal arrangement comprises a second side element being part of the second robot part and immobile in relation to the same, one of the second side element and the gap element including a second surface in a food grade material, and the other one of the second side element and the gap element including a second seal element configured to be in sliding contact with the second surface.

8. The robot joint according to claim 1, wherein the first seal element is a rubber gasket.

9. The robot joint according to claim 1, wherein the energizing mechanism is a spring or an elastic tube.

10. The robot joint according to claim 1, wherein the gap element comprises a body and two legs extending out from the body, wherein one of the two legs includes the first seal element configured for sliding contact with the first surface, and wherein the body forms an external side of the gap element.

11. A robot joint comprising:

a first robot part and a second robot part arranged to have a relative movement in between, a joint gap separating the first robot part and the second robot part from each other, and a seal arrangement for sealing the joint gap against external impact, the seal arrangement including a first side element being part of the first robot part and immobile in relation to the same, and a gap element extending across the joint gap, wherein one of the first side element and the gap element includes a first surface in a food grade material, and the other one of the first side element and the gap element includes a first seal element configured to be in sliding contact with the first surface, wherein the seal arrangement comprises a second side element being part of the second robot part and immobile in relation to the same, one of the second side element and the gap element including a second surface in a food grade material, and the other one of the second side element and the gap element including a second seal element configured to be in sliding contact with the second surface.

12. The robot joint according to claim 11, wherein the second side element is integral with the second robot part.

13. The robot joint according to claim 11, wherein the second robot part comprises a second robot interface configured to receive the second side element.

14. The robot joint according to claim 1, wherein the second robot part comprises a second recess partly accommodating the gap element.

15. The robot joint according to claim 11, wherein the first surface and/or the second surface has a surface hardness of at least 800 HV0.05.

16. The robot joint according to claim 11, wherein the first surface and/or the second surface has a surface roughness expressed as an $R_a$ value of at most 0.8 μm.

17. A robot joint comprising:

a first robot part and a second robot part arranged to have a relative movement in between, a joint gap separating the first robot part and the second robot part from each other, and a seal arrangement for sealing the joint gap against external impact, the seal arrangement including a first side element being part of the first robot part and immobile in relation to the same, and a gap element extending across the joint gap, wherein the first side element includes a first surface in a food grade material, and the gap element includes a first seal element configured to be in sliding contact with the first surface, wherein a second side element being part of the second robot part and immobile in relation to the same includes a second surface in a food grade material, and the gap element includes a second seal element configured to be in sliding contact with the second surface.

18. A robot joint comprising:

a first robot part and a second robot part arranged to have a relative movement in between, a joint gap separating the first robot part and the second robot part from each other, and a seal arrangement for sealing the joint gap against external impact, the seal arrangement including a first side element being part of the first robot part and immobile in relation to the same, and a gap element extending across the joint gap, wherein the gap element includes a first surface in a food grade material, and the first side element includes a first seal element configured to be in sliding contact with the first surface, wherein the gap element comprises a second surface in a food grade material, and a second side element being part of the second robot part and immobile in relation to the same includes a second seal element configured to be in sliding contact with the second surface.

* * * * *